T. A. FALL.
CLUTCH.
APPLICATION FILED AUG. 28, 1920.
1,412,234.
Patented Apr. 11, 1922.
2 SHEETS—SHEET 1.
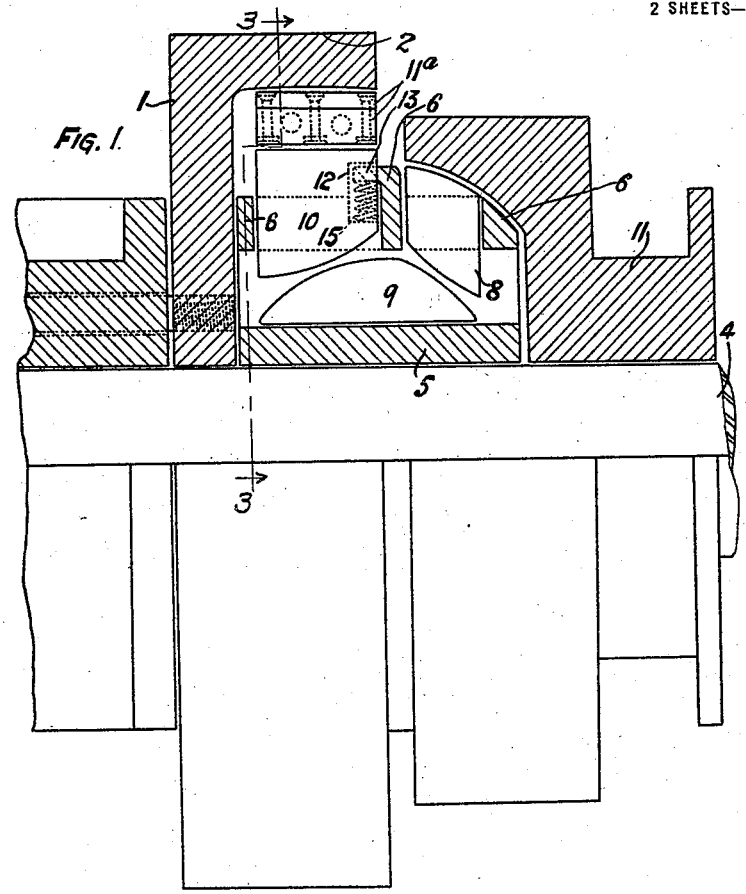
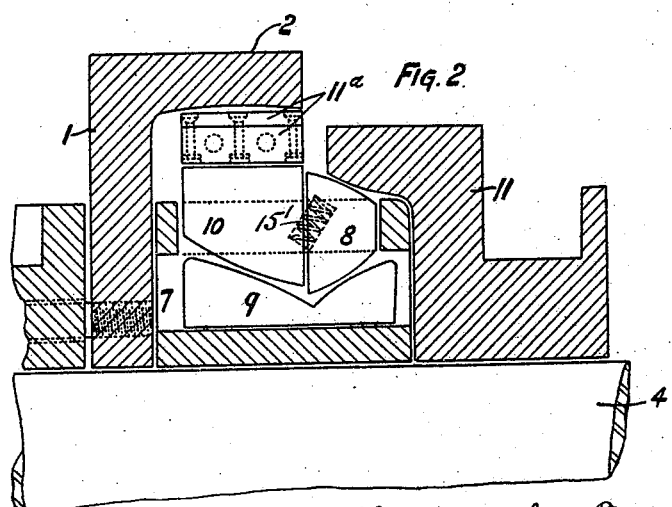
Thomas Arthur Fall,
Inventor.
Pennie, Davis, Marvin & Edmonds,
Attorneys.

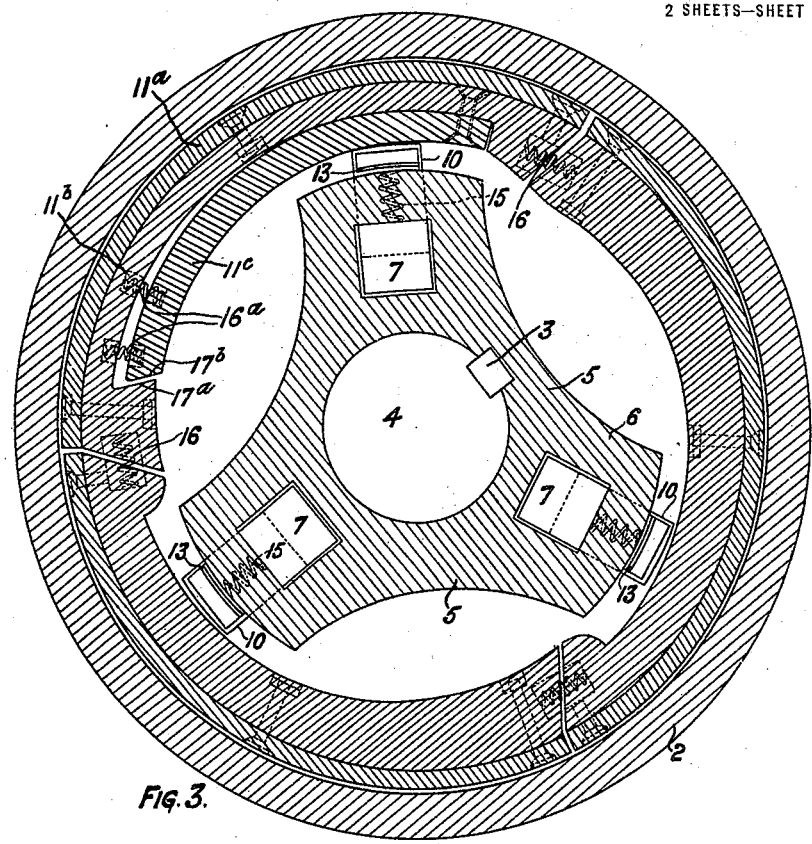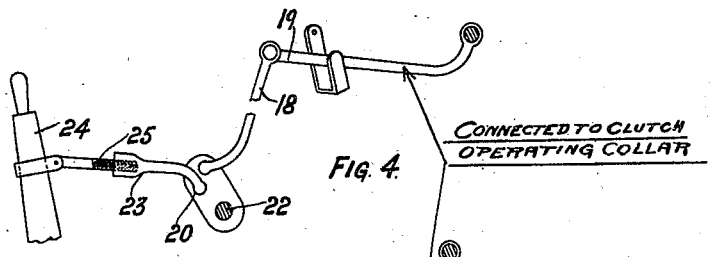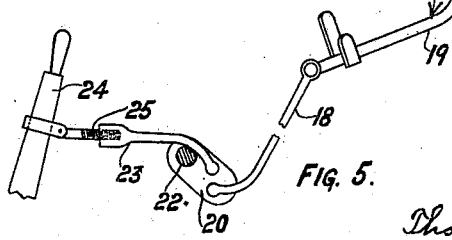

UNITED STATES PATENT OFFICE.

THOMAS ARTHUR FALL, OF LONDON, ENGLAND.

CLUTCH.

1,412,234.  Specification of Letters Patent. Patented Apr. 11, 1922.

Application filed August 28, 1920. Serial No. 406,537.

*To all whom it may concern:*

Be it known that I, THOMAS ARTHUR FALL, a subject of the King of the United Kingdom of Great Britain and Ireland, and residing at London, England, have invented a certain new and useful Improvement in or Relating to Clutches, of which the following is a specification.

This invention relates to improvements in clutches and has for its object to provide an improved construction affording a locked drive and a locked release and offering the advantages of simplicity and accessibility combined with low cost. The improved clutch is suitable for use in starting and stopping machinery in general or for use in motor vehicles.

In accordance with the invention transmission is effected by means of one or more sets of cooperating wedges adapted to force radially movable segments into driving engagement with one of the clutch members. According to another feature of the invention, the radially movable segments are formed with a plurality of eccentric surfaces over which the wedge members may travel in taking up or transmitting the drive. Further features will hereinafter appear.

The invention is illustrated in the accompanying drawing in which Figs. 1 and 2 are longitudinal sections showing two forms of the improved clutch, Fig. 3 being a transverse section to a slightly different scale taken on line 3—3 of Fig. 1 and Figs. 4 and 5 being detail views showing one form of disengaging gear in different positions.

With reference to the drawings, 1 denotes the female clutch member which is formed with a cylindrical flange 2 the inner periphery of which may be suitably curved and forms one clutch surface. The other clutch member which is suitably secured as by means of a key 3 to the driving shaft 4 and is formed as a cage, comprises a boss 5 provided with a plurality of radial arms 6 formed with pockets 7 each accommodating a train of wedges 8, 9, 10, the wedges of each train being so arranged that, on axial displacement of a sliding collar 11 or the like on the driving shaft 4 operable by clutch-operating mechanism hereinafter described, the final wedge 10 of each train is displaced outwardly into contact with a ring 11ª whereby the ring is caused to enter into frictional engagement with the inner periphery of the female clutch member. The final wedge member of each train is preferably formed with a recess 12 entered by a tongue 13 projecting from the radial arm, the tongue 13 presenting one abutment for a compression spring 15 interposed between the tongue 13 and the base of the recess and serving normally to retain the wedge member 10 in inoperative position. The expansible ring 11ª preferably comprises a plurality of segments separated by springs 16 and presenting on their inner surface to the outwardly moving wedge members a series of surfaces eccentric to the driving shaft 4 so that, on wear taking place, such wear is taken up by the wedge members which merely slide over the eccentric surface to a greater extent before they force the outer surface of the ring against the friction surface of the female clutch member. The outer surface of the ring 11ª may be lined with metal, fabric or like material.

The three wedges 8, 9, 10, of each train may be arranged so that the intermediate wedge 9 presents two inclined faces extending from a central peak, the wedge 9 being adapted to be engaged by the initial wedge 8 which is depressed by axial movement of the sliding collar 11 on the driving shaft 4 whereby movement is caused in the same direction of the intermediate wedge 9 and outward movement of the final wedge 10. As shown in Fig. 2 the intermediate wedge 9 may present two inclined surfaces forming a pocket in which the wedges are movable. The spring 15′ serves the same purpose as the spring 15 shown in Fig. 1.

The segments 11ª may comprise relatively movable segmental strips 11ᵇ, 11ᶜ, the external strip 11ᵇ being lined with fabric for example and the internal strip being engageable with the wedges 10, there being disposed between the strips suitable springs such as helical springs 16ª. The adjacent faces 17ª and 17ᵇ of the segments 11ᵇ and 11ᶜ may be arranged so as to lie substantially radially to the driving shaft though not so shown.

It will be obvious that the clutch can be adapted for motor vehicles, the female clutch member being a flywheel keyed to the crank shaft of an internal combustion engine and serving as the driving member the boss 5 being keyed to the clutch shaft and serving as the driven member.

The clutch may be operated as indicated in Figs. 4 and 5 by means of toggle arms 18, 19, pivoted to a rocker 20 rotatable about a spindle 22 in such wise that the lever is locked in gear or out of gear.

The rocker 20 is actuated by a bar 23 associated with a hand lever 24 with provision for adjustment as at 25, the bar being pivoted to the rocker at a point eccentric to the axis and being appropriately bent so as to permit the rocker to rock beyond the dead centre and thus to ensure that the rocker 20 will not be restored to initial position for disengagement unless the hand lever is returned to its first position by moving the striking lever 19 and thus tripping the rocker over the dead centre. The rocker 20 is in turn connected to the collar 11 by means of the toggle arms 18, 19.

I claim:

1. A clutch comprising a pair of clutch members, one of said members formed with pockets, trains of cooperating wedges carried in said pockets, means for displacing such wedges relatively to one another and radially movable segments engageable with the other clutch member, said segments having eccentric surfaces engageable by one wedge of each train, said wedges so arranged that on displacement of one of the wedges of each train another wedge of said train is forced radially outwards whereby to force said segments into engagement with said other clutch member.

2. A clutch comprising a pair of clutch members, one of said members formed as a cage, a train of three cooperating wedges carried in said cage, an expansible ring engageable with the other clutch member, and a sliding member slidable axially of said last mentioned clutch member and shaped to contact with one member of said train, said wedges so arranged that on displacement of said sliding member, one of said wedges is forced radially inwards, an intermediate wedge is forced axially and a final wedge of said train is forced radially outwards, whereby to force said expansible ring into engagement with said other clutch member.

3. A clutch comprising a pair of clutch members, one of said members formed as a cage, trains of three cooperating wedges carried in said cage, an expansible ring engageable with the other clutch member, a sliding member slidable axially of said last mentioned clutch member and shaped to contact with one member of each of said trains, said wedges so arranged that on displacement of said sliding member, one of the wedges of each train is forced inwards, an intermediate wedge of each train is forced axially, and a final wedge of each train is forced outwards whereby to force said expansible ring into engagement with said other clutch member, and spring means acting counter to said wedges to permit said expansible ring to move out of engagement with said other clutch member.

4. A clutch comprising a pair of clutch members, one of said members formed as a cage, a train of three cooperating wedges carried in said cage, an expansible ring engageable with the other clutch member, and a sliding member, slidable axially of said last mentioned clutch member and shaped to contact with one member of said train, said wedges so arranged that on displacement of said sliding member, one of said wedges is forced radially inwards, an intermediate wedge is forced axially and a final wedge of said train is forced radially outwards, whereby to force said expansible ring into engagement with said other clutch member and spring means acting on said final wedge substantially as and for the purpose set forth.

5. A clutch comprising a pair of clutch members, one of said members formed as a cage, trains of three cooperating wedges carried in said cage, radially movable segments engageable with the other clutch member, said segments having eccentric surfaces engageable by one wedge of each train, a sliding member sliding axially of said last mentioned clutch member and shaped to contact with one member of each of said trains, said wedges so arranged that on displacement of said sliding member, one of the wedges is forced inwards, an intermediate wedge of each train is forced axially, and a final wedge of each train is forced outwards whereby to force one of said segments into engagement with said other clutch member, and spring means acting counter to said wedges to permit said segments to move out of engagement with said other clutch member.

In testimony whereof I have signed my name to this specification in the presence of two subscribing witnesses.

THOMAS ARTHUR FALL.

Witnesses:
 HAROLD FAIRWEATHER,
 MAUD M. MANSFIELD.